(12) United States Patent
Huang et al.

(10) Patent No.: US 10,613,671 B2
(45) Date of Patent: Apr. 7, 2020

(54) DISPLAY PANEL HAVING TOUCH ELECTRODES AND FORCE SENSORS IN PERIPHERY AREA AND CONTROL METHOD THEREOF

(71) Applicant: XIAMEN TIANMA MICRO-ELECTRONICS CO., LTD., Xiamen (CN)

(72) Inventors: Min Huang, Xiamen (CN); Wenqiang Yang, Xiamen (CN); Hao Wu, Xiamen (CN); Qian Yang, Xiamen (CN); Ying Sun, Xiamen (CN); Yumin Xu, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/973,535

(22) Filed: May 8, 2018

(65) Prior Publication Data
US 2018/0260065 A1     Sep. 13, 2018

(30) Foreign Application Priority Data

Jan. 4, 2018    (CN) .......................... 2018 1 0008079

(51) Int. Cl.
  *G06F 3/041*    (2006.01)
  *G09G 3/20*    (2006.01)
  *G06F 3/047*    (2006.01)

(52) U.S. Cl.
  CPC ............ *G06F 3/0414* (2013.01); *G06F 3/047* (2013.01); *G06F 3/0412* (2013.01);
  (Continued)

(58) Field of Classification Search
  CPC .................................................. G06F 3/0414
  (Continued)

(56) References Cited

U.S. PATENT DOCUMENTS

| 2017/0003811 A1* | 1/2017 | Lu  | G06F 3/0416 |
| 2017/0242518 A1* | 8/2017 | Liu | G06F 3/0414 |
| 2018/0129343 A1* | 5/2018 | Zhai | G06F 3/0416 |

FOREIGN PATENT DOCUMENTS

| CN | 107479759 A | 12/2017 |
| CN | 107527600 A | 12/2017 |

OTHER PUBLICATIONS

Office Action of Chinese Patent Application No. 201810008079.0 dated Jan. 6, 2020.

* cited by examiner

*Primary Examiner* — Long D Pham
(74) *Attorney, Agent, or Firm* — Kilpatrick Townsend & Stockton, LLP

(57) ABSTRACT

Provided are a display panel, a display device, and a display panel control method. The display panel includes a display area and a non-display area. The non-display area includes a first area and a second area, and at least one first force-sensing sensor is provided in the first area and/or the second area. A plurality of touch electrodes and a plurality of touch signal lines respectively electrically connected to each of the touch electrodes are provided in the display area, and the touch signal lines include at least one multiplexed signal line respectively corresponding to each of the at least one first force-sensing sensor. The display area further includes at least one transverse connecting line. The display panel further includes at least one switch device, each of which and a corresponding transverse connecting line are connected in series between a corresponding first force-sensing sensor and a corresponding multiplexed signal line.

14 Claims, 10 Drawing Sheets

(52) U.S. Cl.
CPC ............. *G06F 3/0416* (2013.01); *G09G 3/20* (2013.01); *G06F 2203/04105* (2013.01)

(58) Field of Classification Search
USPC .......................................................... 345/173
See application file for complete search history.

DISPLAY PANEL HAVING TOUCH ELECTRODES AND FORCE SENSORS IN PERIPHERY AREA AND CONTROL METHOD THEREOF

CROSS-REFERENCE TO RELATED APPLICATIONS

The present application claims priority to Chinese Patent Application No. 201810008079.0, filed on Jan. 4, 2018, the content of which is incorporated herein by reference in its entirety.

TECHNICAL FIELD

The present disclosure relates to the field of display technologies, and in particular, to a display panel, a display device, and a display panel control method.

BACKGROUND

In addition to the traditional touch technology that can detect the touch position, a force touch technology capable of detecting a magnitude of a force of the force touch has emerged with the development of touch display technologies. The force touch can achieve the more convenient human-computer interaction. A force-sensing sensor is an essential element for achieving the force touch. The force-sensing sensor is integrated on the display panel. A connecting line is provided between the force-sensing sensor and a driving chip. The driving chip provides the force-sensing sensor with a bias voltage via the connecting line, and receives a signal output by the force-sensing sensor via the connecting line, so as to detect the force touch.

At present, the force-sensing sensor is generally disposed in a non-display area in the periphery of the display panel. The non-display area is usually also provided with a driving circuit and various signal lines. It is necessary to provide signal lines corresponding to the force-sensing sensor. Thus, this can occupy relatively large space of the non-display area, which is disadvantageous to the design of a narrow frame.

SUMMARY

Embodiments of the present disclosure provide a display panel, a display device and a display panel control method, which can reduce the space occupied by the non-display area in the periphery of the display panel, thereby facilitating the design of the narrow frame.

In a first aspect, embodiments of the present disclosure provide a display panel. The display panel includes a display area and a non-display area located in the periphery of the display area. The display area includes a plurality of data lines. The plurality of data lines extends along a first direction and is arranged along a second direction. The non-display area includes a first area and a second area. The first area and the second area are located on two opposite sides of the display area in the second direction, respectively, and at least one first force-sensing sensor is provided in the first area and/or the second area. A plurality of touch electrodes and a plurality of touch signal lines respectively electrically connected to each of the touch electrodes are provided in the display area, and the touch signal lines include at least one multiplexed signal line respectively corresponding to each of the at least one first force-sensing sensor. The display area further includes: at least one transverse connecting line respectively corresponding to each of the at least one first force-sensing sensor, the transverse connecting lines extending in the second direction. The display panel further includes at least one switch device respectively corresponding to each of the at least one first force-sensing sensor. Each of the at least one switch device and a corresponding transverse connecting line are connected in series between a corresponding first force-sensing sensor and a corresponding multiplexed signal line, so that each of the at least one first force-sensing sensor is electrically connected to a corresponding multiplexed signal line through a corresponding switch device.

In a second aspect, embodiments of the present disclosure provide a display device including the display panel according to the first aspect.

In a third aspect, embodiments of the present disclosure provide a display panel control method applied to the display panel according to the first aspect. The display panel control method includes a touch-sensing phase, in which the at least one switch device controls a disconnection between each of the force-sensing sensors and a corresponding multiplexed signal line; and a force-sensing phase, in which the at least one switch device controls a connection between each of the force-sensing sensors and a corresponding signal line.

BRIEF DESCRIPTION OF DRAWINGS

The accompanying drawings are briefly introduced as follows.

DESCRIPTION OF EMBODIMENTS

In order to clarify purposes, technical solutions and advantages of the embodiments of the present disclosure, the technical solutions of the embodiments are described in detail as below with reference to the accompanying drawings. It should be understood that the embodiments described hereinafter are only a part of all the embodiments.

The technical terms used in the embodiments of the present disclosure are merely used for the purpose of describing particular embodiments, but not intended to limit the present disclosure. The singular forms "a", "an" and "the" used in the embodiments of the present disclosure and the appended claims also include the meaning of the plural forms, unless otherwise noted.

Figure 1:
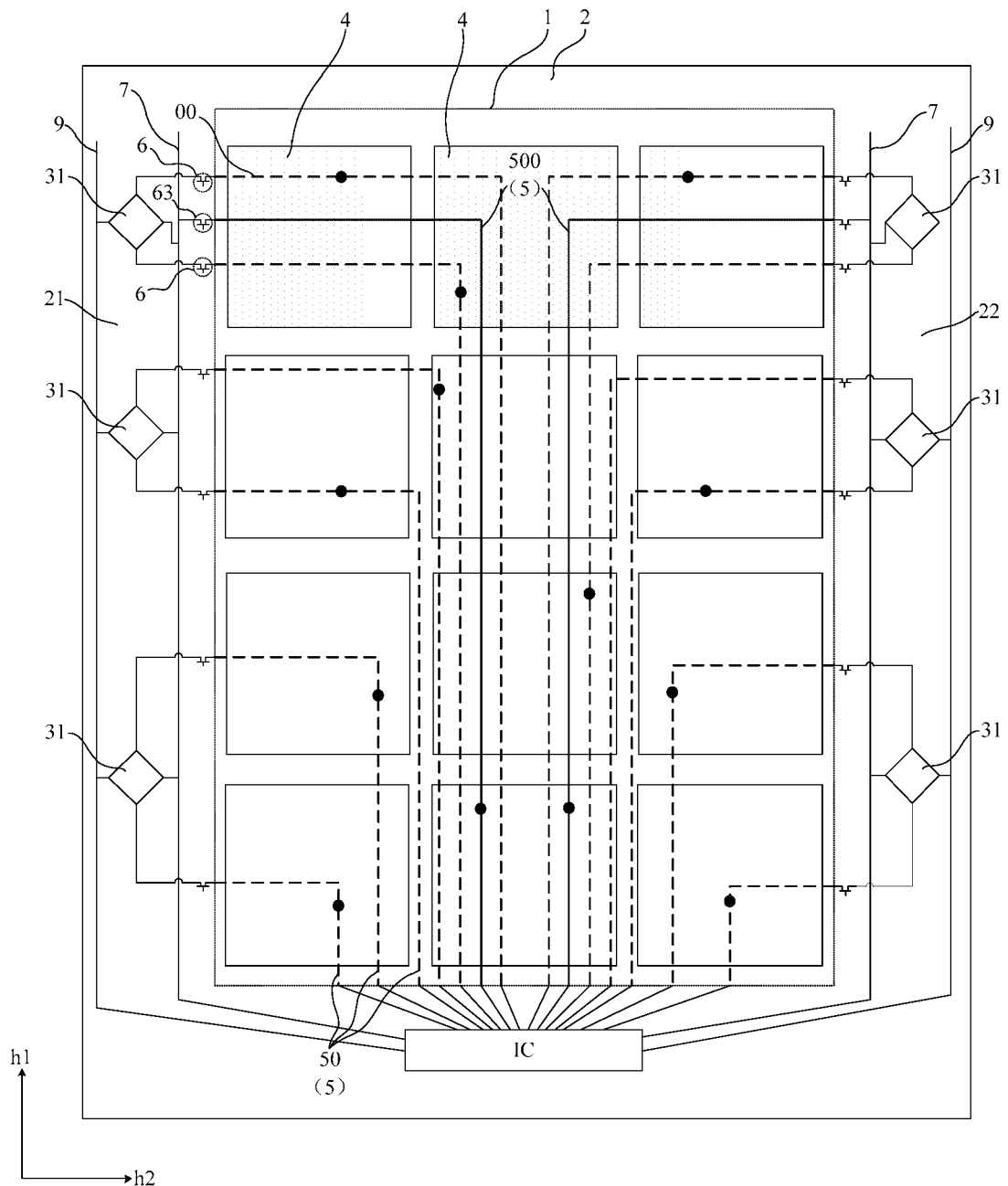
FIG. 1 is a structural schematic diagram of a display panel according to an embodiment of the present disclosure.
Figure 2:
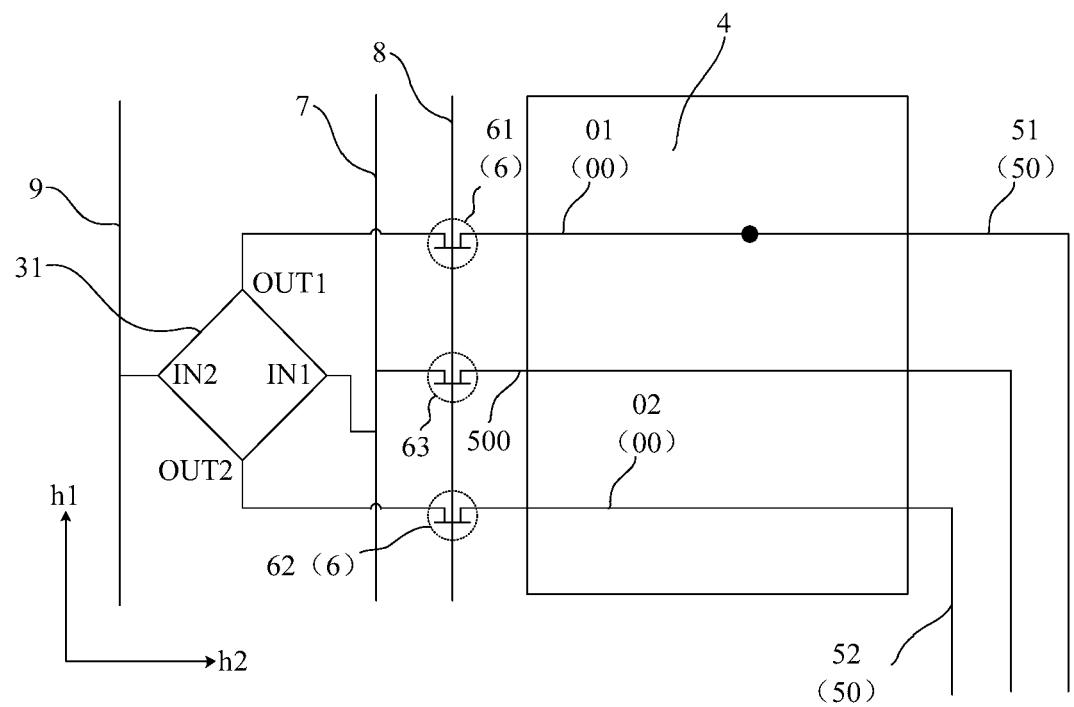
FIG. 2 is a partial enlarged schematic diagram of the display panel shown in FIG. 1.

As shown in FIGS. 1-2, FIG. 1 is a structural schematic diagram of a display panel according to an embodiment of the present disclosure, and FIG. 2 is a partial enlarged schematic diagram of the display panel shown in FIG. 1. The embodiment of the present disclosure provides a display panel including a display area 1 and a non-display area 2 located in the periphery of the display area 1. The display area 1 includes a plurality of data lines (not shown in FIG. 1), which extends along a first direction h1 and is arranged along a second direction h2. The non-display area 2 includes a first area 21 and a second area 22. The first area 21 and the second area 22 are located on opposite sides of the display area 1 in the second direction h2. At least one first force-sensing sensor 31 is provided in the first area 21 and/or the second area 22. A plurality of touch electrodes 4 and touch signal lines 5 respectively electrically connected to each of the touch electrodes 4 are provided in the display area 1. Black solid circles represent locations where the touch electrodes 4 are connected to the touch signal lines 5. It should be understood that each of the touch electrodes 4 is connected to one or more touch signal lines 5, as long as each of the touch electrodes 4 is connected to at least one touch signal line 5 and any one of the touch signal lines 5 is connected to only one touch electrode 4. That is, the touch electrode 4 is a self-capacitive touch electrode, and can be multiplexed as a common electrode. The plurality of touch electrodes 4 are arranged in a matrix, and the touch signal lines 5 include multiplexed signal lines 50 corresponding to the first force-sensing sensors 31. The multiplexed signal lines 50 are represented by bold dotted lines in FIG. 1, and each of the first force-sensing sensors 31 can correspond to one or more multiplexed signal lines 50. FIG. 1 merely illustrates a structure in which each the first force-sensing sensor 31 corresponds to two multiplexed signal lines 50. The display area 1 further includes transverse connecting lines 00 corresponding to the first force-sensing sensor 31, and the transverse connecting lines 00 extend along the second direction h2. The display panel further includes switch devices 6 corresponding to first force-sensing sensor 31. The switch device 6 and the corresponding transverse connecting line 00 are connected in series between the corresponding first force-sensing sensor 31 and the corresponding multiplexed signal line 50, so that each first force-sensing sensor 31 is electrically connected to a corresponding multiplexed signal line 50 through the corresponding switch device 6. It should be noted that the multiplexed signal line 50 can be a signal line only extending along the first direction h1, or can be a signal line partially extending along the first direction h1 and partially extending along the second direction h2, regardless of the structure of the multiplexed signal line. Since the first force-sensing sensor 31 is located on the left and right sides of the display area 1 and at least a part of the multiplexed signal line 50 extends along the first direction h1, the touch electrodes 4 in the display area 1 are electrically connected to a driving circuit IC on the underside of the display area 1. Therefore, each of the multiplexed signal lines 50 needs to be electrically connected to a corresponding first force-sensing sensor 31 through the transverse connecting line 00. In addition, FIGS. 1-2 merely illustrate a structure in which a first force-sensing sensor 31 is connected to a switch device 6, the switch device 6 is connected to one end of a transverse connecting line 00, the other end of the transverse connecting line 00 is connected to a multiplexed signal line 50, and the multiplexed signal line 50 is further connected to a corresponding touch electrode 4. In other possible embodiments, it is also possible that a first force-sensing sensor is connected one end of a transverse connecting line, the other end of the transverse connecting line is connected to a switch device, the switch device is connected to a multiplexed signal line, and the multiplexed signal line is further connected to a corresponding touch electrode. The specific position and order of connection of the switch device 6 and transverse connecting line 00 are not limited, as long as the switch device 6 and the corresponding transverse connecting line 00 are connected in series between the corresponding first force-sensing sensor 31 and the corresponding multiplexed signal line 50.

In one embodiment, the touch electrode 4 is used for detecting the existence of a touch operation and a position of a touch operation on the display panel, so as to provide a touch function. The working of the display panel according to this embodiment of the present disclosure includes a touch-sensing phase and a force-sensing phase. In the touch-sensing phase, each of the switch devices 6 is turned off, i.e., each switch device 6 is used to controls a disconnection between each first force-sensing sensor 31 and a corresponding multiplexed signal line 50. In this case, the multiplexed signal lines 50 are used to achieve signal transmission of the touch electrodes 4. For example, each touch signal line 5 is connected to the driving circuit IC. In the touch-sensing phase, the driving circuit IC provides a driving signal to each touch electrode 4 through the touch signal lines 5 (including the multiplexed signal lines 50), and simultaneously receives a sensing signal on each of the touch electrodes 4 through the touch signal lines 5. When there is a touch operation on the display panel, a touch electrode 4 at the corresponding touch position generates a corresponding sensing signal due to the coupling effect of the touch operation, and then the IC can determine the touch position based on the obtained sensing signal that corresponds to each of the touch electrodes 4, thereby achieving the touch function. In the force-sensing phase, each switch device 6 is turned on, i.e., each switch device 6 is used to control a connection between each first force-sensing sensor 31 and the corresponding multiplexed signal line 50. In this case, the multiplexed signal lines 50 are used to achieve signal transmission of the first force-sensing sensor 31. For example, as shown in FIG. 2, each force-sensing sensor 31 includes a first input terminal IN1, a second input terminal IN2, a first output terminal OUT1, and a second output terminal OUT2. The first output terminal OUT1 and the second output terminal OUT2 are respectively coupled to corresponding multiplexed signal lines 50 through corresponding switch devices 6, i.e., the multiplexed signal line 50 acts as an output signal line of the first force-sensing sensor 31 in the force-sensing phase, so as to transmit a signal output by the first force-sensing sensor 31 to the driving circuit IC. The driving circuit IC determines a size of the force based on the signal output by the first force-sensing sensor 31, thereby achieving the force detection function. It should be understood that in the force-sensing phase, even the signal output by the first force-sensing sensor 31 is transmitted to the touch electrode 4, the signal output by the first force-sensing sensor 31 does not have obvious influence on the detection in the force-sensing phase, because the force-sensing phase and the touch-sensing phase are two independent phases. In addition, for minimizing the influence of the force-sensing phase on the touch-sensing phase, a switch corresponding to the multiplexed signal line 50 can be added, so that the multiplexed signal line 50 can be connected to the touch electrode 4 via the switch. In the force-sensing phase, the switch is controlled to be turned off, so that the signal output by the first force-sensing sensor 31 may not be transmitted to the touch electrode 4, thereby completely eliminating the influence on the touch-sensing phase. In the touch-sensing phase, the switch is controlled to be turned on, so that the touch electrode 4 can use the multiplexed signal line 50 to transmit a touch signal.

FIG. 2 only schematically illustrates a specific structure in which the two output terminals of the first force-sensing sensor 31 are connected to the multiplexed signal lines 50. In other possible embodiments, one output terminal of the first force-sensing sensor can be connected to the multiplexed signal line, and the other terminals can be connected to separate signal lines. Alternatively, one or two input terminals of the first force-sensing sensor can be connected to the multiplexed signal line(s), and the other terminals can be connected to separate signal lines. Alternatively, all of two input terminals and two output terminal of the first force-sensing sensor can be connected to multiplexed signal lines. In the embodiments of the present disclosure, which terminal of the first force-sensing sensor is connected to the multiplexed signal line(s) is not specifically limited. As long as at least one terminal of the first force-sensing sensor is connected to a multiplexed signal line, multiplexing of signal lines can be achieved.

In addition, It should be noted that, in the structure shown in FIG. 1, each transverse connecting line 00, each multiplexed signal line 50, and each non-multiplexed signal line 500 do not intersect with one another, and thus the transverse connecting lines 00, the multiplexed signal lines 50 and non-multiplexed signal lines 500 can be fabricated in a same layer without any mutual influence. However, in other possible embodiments, the transverse connecting lines may intersect with multiplexed signal lines that do not correspond to the transverse connecting lines, or the transverse connecting lines may intersect with the non-multiplexed signal lines. In this case, if the transverse connecting lines and the touch signal lines are fabricated in the same layer, a bridge connection through another layer is required at intersection positions. For example, at an intersection position where a transverse connecting line extending along the second direction h2 intersects with one of the non-multiplexed signal lines extending along the first direction h1, the transverse connecting line can be divided into two separated parts, so that the non-multiplexed signal line can pass between the two separated parts. In the meantime, a bridge structure, other than the layer where touch connecting line is located, is provided at the intersection position, so that the two separated parts of the transverse connecting line are connected to the bridge structure by a through-hole connection. On the one hand, the connection between two separated parts of the transverse connecting line can be achieved by the bridge structure. On the other hand, the transverse connecting line and the non-multiplexed signal line can intersect with each other but may not be mutually affected.

In the display panel according to the embodiment of the present disclosure, the touch electrodes and the touch signal lines respectively electrically connected to each of the touch electrodes are disposed in the display area, the force-sensing sensors are disposed in the non-display area, the touch signal line includes multiplexed signal lines, and the multiplexed signal lines are connected to the force-sensing sensor via the switch devices and the transverse connecting line. In this way, the multiplexed signal lines can be used to achieve signal transmission of the touch electrodes in the touch-sensing phase, and can also be used to achieve signal transmission of the force-sensing sensor in the force-sensing phase. By multiplexing the signal lines, it is unnecessary to separately provide signal lines for the force-sensing sensors, so that the non-display area in the periphery of the display panel can occupy less space, thereby facilitating the design of a narrow frame.

In an embodiment, as shown in FIGS. 1 and 2, the multiplexed signal line 50 includes a first multiplexed signal line 51 and a second multiplexed signal line 52 both corresponding to each first force-sensing sensor 31; the switch device 6 includes a first switch transistor 61 and a second switch transistor 62 both corresponding to each first force-sensing sensor 31; the transverse connecting line 00 includes a first transverse connecting line 01 and a second transverse connecting line 02; a first output terminal OUT1 of each first force-sensing sensor 31 is electrically connected to a corresponding first multiplexed signal line 51 through. a corresponding first switch transistor 61 and a corresponding first transverse connecting line 01; and a second output terminal OUT2 of each first force-sensing sensor 31 is electrically connected to a corresponding second multiplexed signal line 52 through a corresponding second switch transistor 62 and a corresponding second transverse connecting line 02.

In an embodiment, as shown in FIGS. 1 and 2. the touch signal line 5 further includes non-multiplexed signal lines 500 that are not electrically connected to any first force-sensing sensor 31. In FIG. 1, the non-multiplexed signal lines 500 are represented by thick solid lines. The display panel further includes common electrode connecting lines 7 and third switch transistors 63 respectively corresponding to each of the non-multiplexed signal lines 500. Each of the non-multiplexed signal lines 500 is connected to the common electrode connecting line 7 through a corresponding third switch transistor 63. A first input terminal IN1 of each first force-sensing sensor 31 is electrically connected to the common electrode connecting line 7.

In one embodiment, the common electrode connecting line 7 is connected to the driving circuit IC, and the driving circuit IC always supplies a common voltage signal to the common electrode connecting line 7. In addition to the touch-sensing phase and the force-sensing phase, the working process of the display panel also includes a display phase. In the display phase, the driving circuit IC outputs the common voltage signal to each of the touch signal lines 5. The touch electrodes 4 are multiplexed as a common electrode, and a potential on each touch electrode 4 is a potential of the common electrode. The display panel further includes a pixel electrode. The liquid crystal deflects under an electric field formed between the pixel electrode and the common electrode, thereby achieving the display function. Each of the third switch transistors 63 is turned on, and the common electrode connecting line 7 is used to electrically connect the touch electrodes 4, which are electrically connected to the common electrode connecting line 7, to each other, so that the potentials of the touch electrodes 4 tend to be consistent, thereby improving the display uniformity. In the touch-sensing phase, each of the third switch transistors 63 is turned off so that each of the non-multiplexed signal lines 500 is independent, thereby achieving signal transmission of a corresponding touch electrode 4. In the force-sensing phase, each of the third switch transistors 63 is turned on or off, the driving circuit IC provides the first input terminal IN1 of the first force-sensing sensor 31 with a required input signal, and the second input terminal IN2 of the first force-sensing sensor 31 acquires another input signal, so that the first force-sensing sensor 31 works normally under a bias voltage obtained at the first input terminal IN1 and the second input terminal IN2, thereby achieving a force detection function.

In an embodiment, as shown in FIG. 2, the above display panel further includes common electrode control signal lines 8 (not shown in FIG. 1), which are electrically connected to control terminals of each first switch transistor 61, each second switch transistor 62 and each third switch transistor 63. Each of the first switch transistors 61, each of the second switch transistors 62 and each of the third switch transistors 63 are N-type transistors or P-type transistors.

In order to further save space, each of the first switch transistors 61, each of the second switch transistor 62 and each of the third switch transistor 63 can be connected through a single common electrode control signal line 8, and these three types of switch transistors are of the same control type, i.e., the first switch transistors 61, the second switch transistor 62 and the third switch transistor 63 perform the same turn-on or turn-off action under the control of the common electrode control signal line 8. In this way, it is unnecessary to separately provide control signal lines for each switch transistor type, thereby further saving the space.

In an embodiment, the above display panel also includes input signal lines 9, which are electrically connected to a second input terminal IN2 of each first force-sensing sensor 31.

In one embodiment, the input signal lines 9 are used to provide a required input signal to the second input terminal IN2 of each first force-sensing sensor 31 in the force-sensing phase. In addition, the driving circuit IC supplies the same common voltage signal to the common electrode connecting lines 7 and the input signal lines 9 in the display phase, and in the meantime, the first force-sensing sensors 31 merely function as signal lines, so that each of the touch electrodes 4 is electrically connected to one another through the first force-sensing sensors. In this way, the potentials of the touch electrodes 4 tend to be consistent, thereby improving display uniformity.

Figure 3:
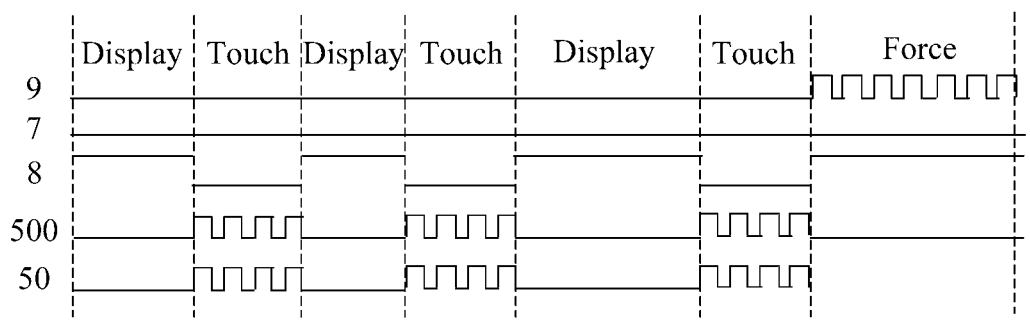
FIG. 3 is a sequence diagram of signal lines shown in FIGS. 1 and 2.

The display panel according to the embodiment of the present disclosure shown in FIG. 1 and FIG. 2 will be further described through a specific display panel driving process, as shown in FIG. 3. FIG. 3 is a sequence diagram of each signal line shown in FIGS. 1 and 2, in which each frame time of the display panel includes a plurality of display phases Display, a plurality of touch-sensing phases Touch, and a force-sensing phase Force. It should be understood that the sequence in FIG. 3 is merely a specific example. Actually, the display phase, the touch-sensing phase, and the force-sensing phase can be set in other manners, as long as the touch-sensing phase and the force-sensing phase take place during the display phase. As shown in FIG. 3, in the display phase Display, the input signal line 9 and the common electrode connecting line 7 output a common voltage, so that both the first output terminal OUT1 and the second output terminal OUT2 of the first force-sensing sensor 31 output the common voltage, the common electrode control signal line 8 outputs a turn-on level to control all the switch transistors to be turned on. Meanwhile, the multiplexed signal line 50 and the non-multiplexed signal line 500 both transmit the common voltage to the touch electrodes 4, and the input signal line 9 and the common electrode connecting line 7 can further make the common voltages on the touch electrodes 4 connected to the two output terminals of the first force-sensing sensor 31 tend to be consistent by the aids of each first force-sensing sensor 31, so that the touch electrodes 4 are multiplexed as a common electrode for achieving the display function. In the touch phase Touch, the input signal line 9 and the common electrode connecting line 7 output the common voltage (in other embodiments, the input signal line 9 and the common electrode connecting line 7 may not provide any signal), the common electrode control signal line 8 outputs a turn-off level to control all the switch transistors to be turned off. Meanwhile, the touch electrodes 4 and the first force-sensing sensors 31 are not electrically connected, and the first force-sensing sensors 31 do not work so as to save power consumption. The multiplexed signal line 50 and the non-multiplexed signal line 500 are used to transmit a touch driving signal to the touch electrode 4 and transmit a touch sensing signal acquired from the touch electrode 4 to the driving circuit IC, which can determine the touch position based on the obtained sensing signal, thereby achieving the touch function. In the force-sensing phase Force, the input signal line 9 outputs a pulse signal to the second input terminal IN2 of the first force-sensing sensor 31, the common electrode connecting line 7 outputs a fixed potential to the first input terminal IN1 of the first force-sensing sensor 31, and the first force-sensing sensor 31 starts to work under the bias voltage between the two input terminals and outputs a force-sensing signal. The common electrode control signal line 8 outputs the turn-on level to control all the switch transistors to be turned on. The force-sensing signal output from two output terminals of the first force-sensing sensor 31 is transmitted to the driving circuit IC through the multiplexed signal line 50. The driving circuit IC determines a size of the force based on the force-sensing signal, thereby achieving the force detection function.

Figure 4:
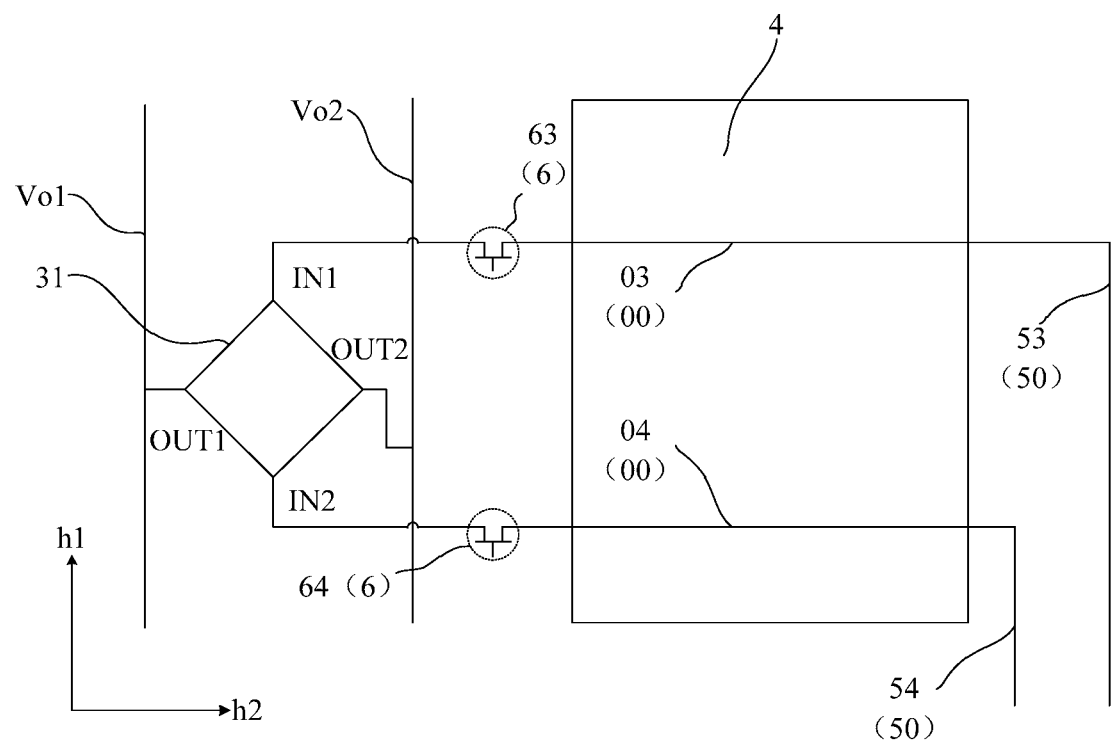
FIG. 4 is a partial enlarged schematic diagram of a display panel according to another embodiment of the present disclosure.
Figure 5:
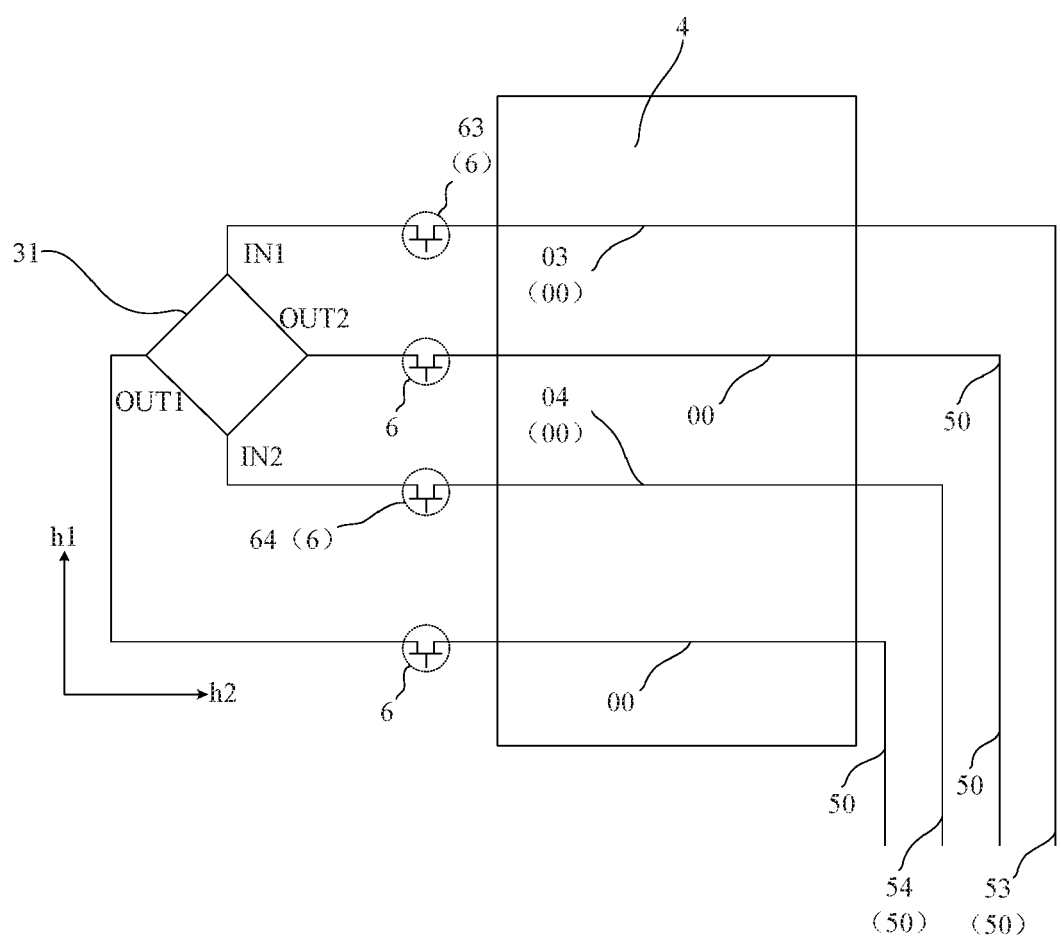
FIG. 5 is a partial enlarged schematic diagram of a display panel according to another embodiment of the present disclosure.

FIG. 4 is a partial enlarged schematic diagram of a display panel according to another embodiment of the present disclosure, and FIG. 5 is a partial enlarged schematic diagram of a display panel according to another embodiment of the present disclosure. In the embodiment shown in FIG. 4 or 5, the multiplexed signal line 50 further includes a third multiplexed signal line 53 and a fourth multiplexed signal line 54; the switch device 6 includes a third switch transistor 63 and a fourth switch transistor 64, the third switch transistor 63 and the fourth switch transistor 64 corresponding to each of the first force-sensing sensors 31; the transverse connecting line 00 further includes a third transverse connecting line 03 and a fourth transverse connecting line 04; the first input terminal IN1 of each first force-sensing sensor 31 is electrically connected to the third multiplexed signal line 53 through the corresponding third switch transistor 63 and the corresponding third transverse connecting line 03; and the second input terminal IN2 of each first force-sensing sensor 31 is electrically connected to the fourth multiplexed signal line 54 through the corresponding fourth switch transistor 64 and the corresponding fourth transverse connecting line 04.

In one embodiment, FIG. 2 illustrates a structure in which two output terminals of the first force-sensing sensor 31 are connected to the multiplexed signal line 50, and FIGS. 4-5 illustrate a structure in which at least two input terminals of the first force-sensing sensor 31 are connected to the multiplexed signal line 50. For example, as shown in FIG. 4, the first output terminal OUT1 of the first force-sensing sensor 31 is connected to a first output signal line Vo1, and the second output terminal OUT2 of the first force-sensing sensor 31 is connected to a second output signal line Vo2. If the plurality of first force-sensing sensors 31 share the first output signal line Vo1 and the second output signal line Vo2, the force-sensing phase can be further divided into a plurality of sub-phases, each of which corresponds to each of the first force-sensing sensors 31. In the first sub-phase, the first input terminal IN1 and the second input terminal IN2 of a corresponding first one of the first force-sensing sensors 31 respectively receive a bias voltage from the corresponding third multiplexed signal line 53 and the corresponding fourth multiplexed signal line 54, and the generated output signal is simultaneously output to the driving circuit IC through the first output signal line Vo1 and the second output signal line Vo2. At this time, there is no input at the first input terminals IN1 and the second input terminals IN2 of other first force-sensing sensors 31, i.e., only the first one of the first force-sensing sensors 31 works in the first sub-phase. In the second sub-phase, the first input terminal IN1 and the second input terminal IN2 of a corresponding second one of the first force-sensing sensors 31 respectively receive a bias voltage from the corresponding third multiplexed signal line 53 and the corresponding fourth multiplexed signal line 54, and the generated output signal is simultaneously output to the driving circuit IC through the first output signal line Vo1 and the second output signal line Vo2. At this time, there is no input at the first input terminals IN1 and the second input terminals IN2 of other first force-sensing sensors 31, i.e., only the second one of the first force-sensing sensor 31 works in the second sub-phase. The force detection process of all the first force-sensing sensors 31 can be realized by analogy. For example, as shown in FIG. 5, the first output terminal OUT1 and the second output terminal OUT2 of each first force-sensing sensor 31 are also respectively connected to the corresponding multiplexed signal line 50 through switch transistors. In the force-sensing phase, all of the switch transistors are controlled to be turned on, so that the bias voltage can be input into the force-sensing 31 through the multiplexed signal line 50 connected to the input terminals of the first force-sensing sensor 31, and in the meantime, the output signal of the force-sensing 31 can be transmitted through the multiplexed signal line 50 connected to the output terminals of the first force-sensing sensor 31.

Figure 6:
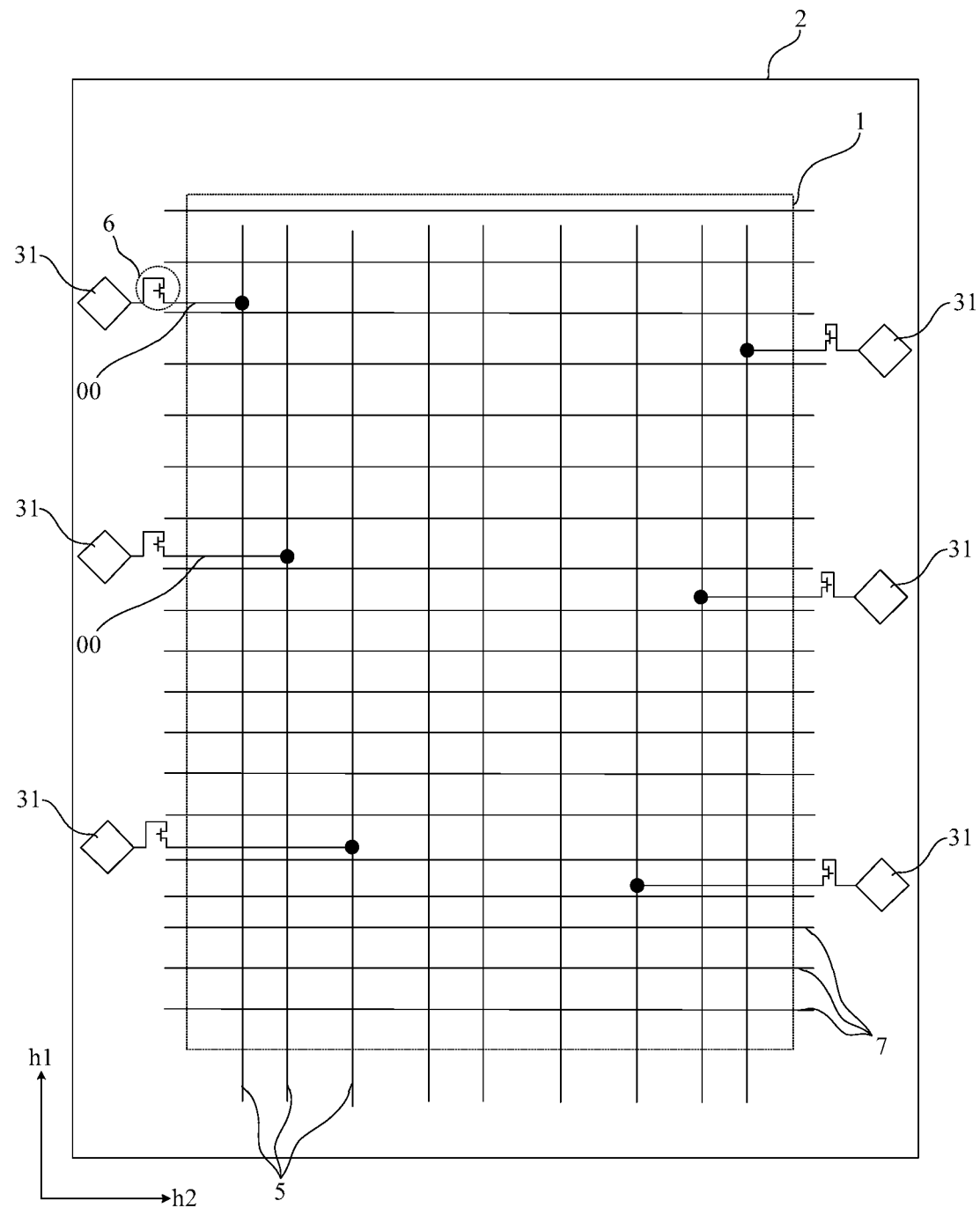
FIG. 6 is a structural schematic diagram of a display panel according to another embodiment of the present disclosure.

FIG. 6 is a structural schematic diagram of a display panel according to another embodiment of the present disclosure. As shown in FIG. 6, the display area 1 includes a plurality of scan lines 7, which extends along the second direction 112 and is arranged along the first direction h1. Each of the touch signal lines 5 extends along the first direction h1 in the display area 1. The transverse connecting lines 00 and the scan lines 7 are arranged in a same layer.

In one embodiment, in the structure shown in FIG. 6, the touch signal lines 5 extend along the first direction h1. In order to avoid intersection between transverse connecting lines 00 and multiplexed signal lines that are electrically connected to different touch electrodes, the transverse connecting lines 00 can be fabricated in a metal layer other than the layer of the touch signal lines 5. For example, the transverse connecting lines 00 and the scanning lines 7 can be disposed in a same layer. In this case, since the transverse connecting lines 00 and the touch signal lines 5 are located in different layers, a through-hole is required to achieve electrical connection between the transverse connecting lines 00 and the touch line 5. In another embodiment, the transverse connecting lines 00 can also be made in the same layer as other film layers. For example, if the display panel includes a light-shielding metal, the transverse connecting lines 00 can be arranged in the same layer of the light-shielding metal, and the light-shielding metal is used to shield the active layer region of thin film transistors to avoid adverse effects of light on the thin film transistors.

Figure 7:
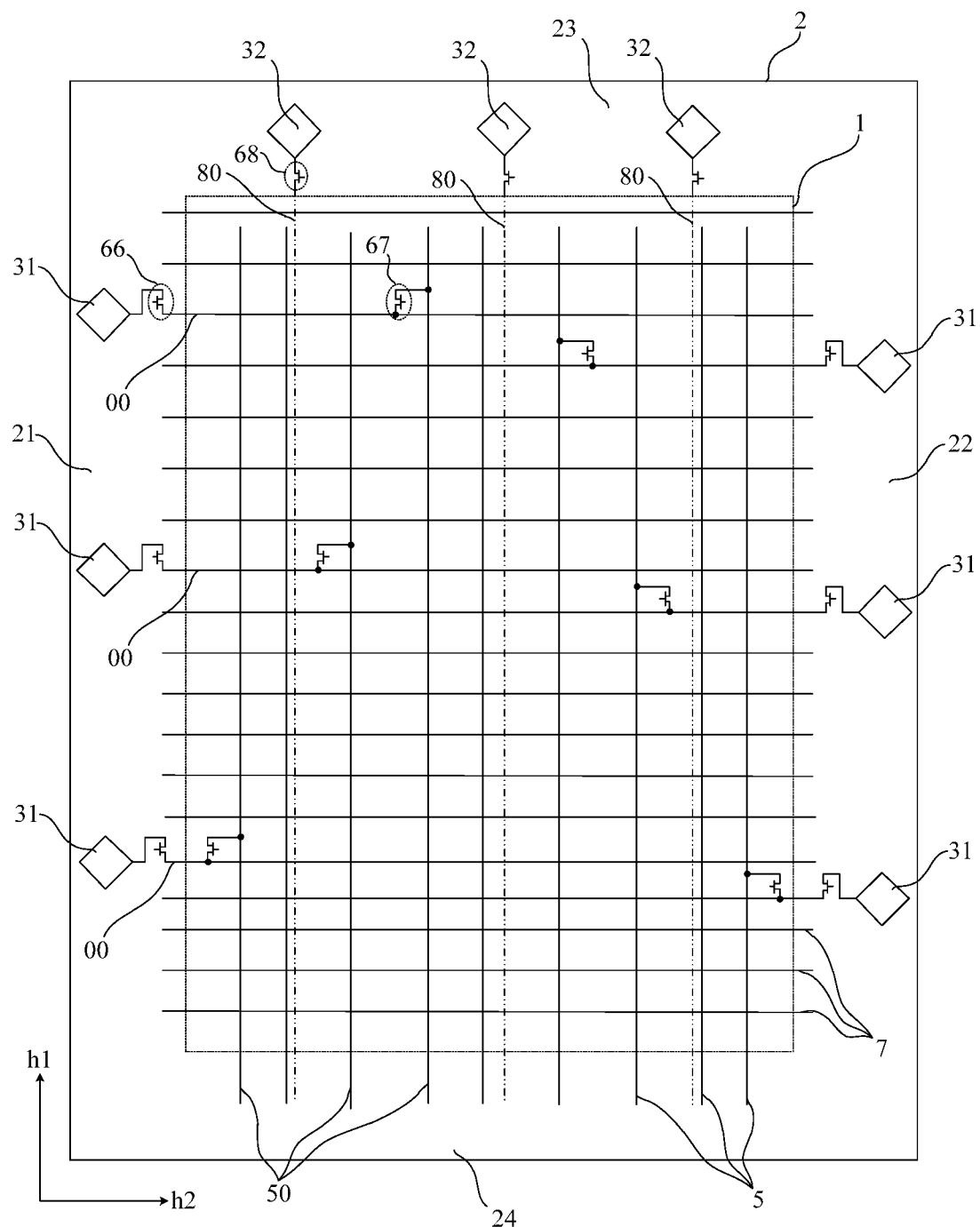
FIG. 7 is a structural schematic diagram of a display panel according to another embodiment of the present disclosure.

FIG. 7 is a structural schematic diagram of a display panel according to another embodiment of the present disclosure. As shown in FIG. 7, the display area 1 includes a plurality of scan lines 7, which extends along the second direction h2 and is arranged along the first direction h1. Each of the touch signal lines 5 extends along the first direction h1 in the display area 1. A part of the plurality of scan lines 7 include transverse connecting lines 00 corresponding to the first force-sensing sensors 31. That is, a part of the scan lines 7 are used as the transverse connecting lines 00 for connecting the first force-sensing sensor 31 and the multiplexed signal line 50. The switch device includes a sixth switch transistor 66 and a seventh switch transistor 67 corresponding to each of the first force-sensing sensors 31. Each of the first force-sensing sensors 31 is connected to the corresponding transverse connecting line 00 through the associated sixth switch transistor 66, and each of the transverse connecting lines 00 is connected to the corresponding multiplexed signal line 50 through the corresponding seventh switch transistor 67.

The first direction h1 is a column direction of sub-pixels in the display panel, and the second direction h2 is a row direction of the sub-pixels in the display panel. The scan line 7 is used to provide a scan signal for sub-pixels of a corresponding row in the display panel. One end of a transverse connecting line 00 is connected to a first force-sensing sensor 31 through a sixth switch transistor 66, and the other end of the transverse connecting line 00 is connected to a corresponding multiplexed signal line 50 through a seventh switch transistor 67. The multiplexing of the transverse connecting line 00 achieves the transmission of the scan signal as well the signal transmission on the force-sensing electrodes. Therefore, the seventh switch transistor 67 is additionally arranged between the transverse connecting line 00 and the multiplexed signal line 50, in order to achieve the multiplexing of the transverse connecting lines 00 in a time division manner. In the display phase, both the sixth switching transistor 66 and the seventh switching transistor 67 are turned off, each of the scanning lines 7 including the transverse connecting line 00 is used to provide the scan signal to the sub-pixels, and each of the touch signal lines 5 including multiplexed signal line 50 is used to transmit a common voltage signal of the touch electrode (not shown in FIG. 6), so that the touch electrode is multiplexed as a common electrode. In the touch-sensing phase, both the sixth switching transistor 66 and the seventh switching transistor 67 are turned off, and the touch signal line 5 is used to transmit the signal on the touch electrode, thereby achieving the touch function. In the force-sensing phase, both the sixth switching transistor 66 and the seventh switching transistor 67 are turned on, the transverse connecting line 00 is connected to the multiplexed signal line 50, and the transverse connecting line 00 as well as the multiplexed signal line 50 are used as the signal lines of the first force-sensing sensor 31, i.e., as input signal lines or the output signal lines. Since the plurality of the first force-sensing sensors 31 is arranged along the first direction h1 on the left and right sides of the display area 1, the transverse connecting lines 00 serve as the connecting lines of the first force-sensing sensors 31 in the second direction h2, and the multiplexed signal lines 50 serve as the connecting lines of the first force-sensing sensors 31 in the first direction h1. In the structure of FIG. 7, the existing signal line structures can be utilized, and only the sixth switching transistor 66 and the seventh switching transistor 67 need to be added, in order to use the touch signal line 5 and the scanning line 7 as the signal lines of the force-sensing sensor. FIG. 7 merely illustrates the structure in which one end of the first force-sensing sensor 31 is connected to the transverse connecting line 00 and the multiplexed signal line 50. It should be understood that the embodiment of the present disclosure do not limit an electrical connection of the other end of first force-sensing sensors 31 to the transverse connecting line 00 and the multiplexed signal line 50.

In an embodiment, as shown in FIG. 7, the non-display area 2 further includes a third area 23 and a fourth area 24. The third area 23 and the fourth area 24 are located in opposite sides of the display area 1 in the first direction h1. At least one second force-sensing sensor 32 is provided in the third area 23 or the fourth area 24. A plurality of data lines includes multiplexed data lines 80 respectively corresponding to each of the second force-sensing sensors 32. It should be noted that FIG. 7 only illustrates the multiplexed data lines 80, instead of all data lines. The switch device further includes an eighth switch transistor 68 corresponding to each of the second force-sensing sensors 32. Each of the second force-sensing sensors 32 is connected to the corresponding multiplexed data line 80 through the corresponding eighth switch transistor 68.

In one embodiment, FIG. 7 only illustrates one multiplexed data line 80 connected to one end of each second force-sensing sensor 32. Two input terminals and two output terminals of each second force-sensing sensor 32 can be connected to one multiplexed data line 80 through a separate eighth switch transistor 68. In addition, the display panel also includes non-multiplexed data lines (not shown in FIG. 7) that are not connected to the second force-sensing sensors 32. The data lines are used to provide each sub-pixel with a data signal for display. In the display phase, each of the eighth switch transistors 68 is turned off, and the driving circuit IC outputs the data signal to each data line. With the scan signal of the scan lines 7, the data signal is sequentially transmitted to the corresponding sub-pixels for achieving the display. In the touch-sensing phase, the eighth switch transistors 68 can be turned on or off. In the force-sensing phase, the eighth switch transistors 68 are turned on, and the driving circuit IC transmits a bias voltage to the second force-sensing sensor 32 through the multiplexed data line 80. In the meantime, the driving circuit IC obtains the output signal of the force-sensing sensor 32 from the output terminal of the second force-sensing sensor 32 through the multiplexed data line 80, thereby achieving the force detection.

Figure 8:
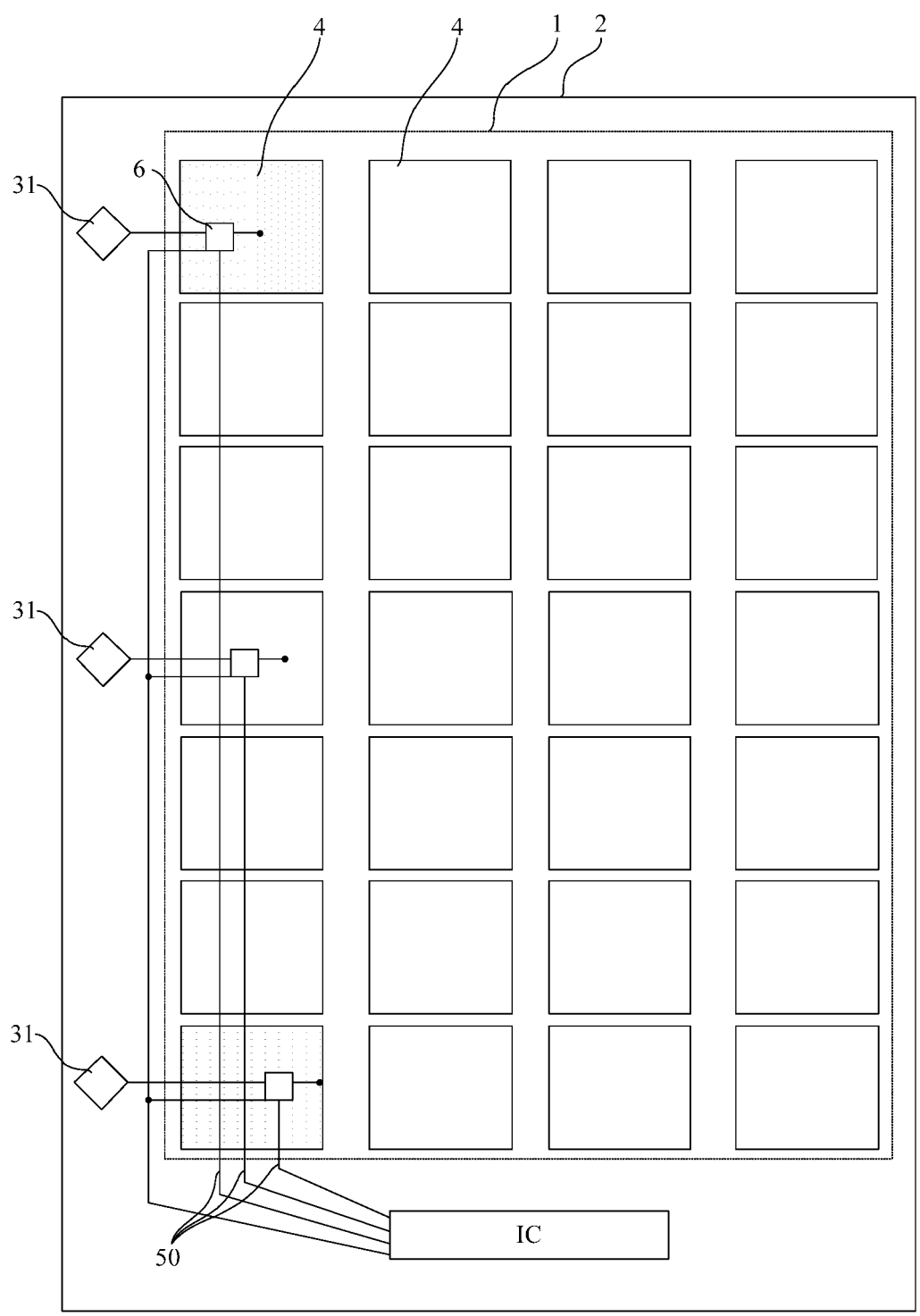
FIG. 8 is a structural schematic diagram of a display panel according to another embodiment of the present disclosure.
Figure 9:
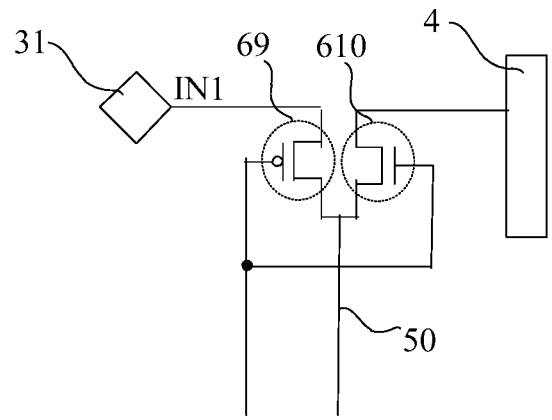
FIG. 9 is an equivalent circuit diagram of a partial structure of the display panel shown in FIG. 8.

FIG. 8 is a structural schematic diagram of a display panel according to another embodiment of the present disclosure, and FIG. 9 is an equivalent circuit diagram of a partial structure of the display panel shown in FIG. 8. In this embodiment, the switch device 6 includes a ninth switch transistor 69 corresponding to each force-sensing sensor 3; a first input terminal IN1 of each force-sensing sensor 3 is connected to a corresponding multiplexed signal line 50 through a corresponding ninth switch transistor 69. The switch device 6 further includes a tenth switch 610 corresponding to each multiplexed signal line 50, and each multiplexed signal line 50 is connected to a corresponding touch electrode 4 through a corresponding tenth switch 610.

The plurality of touch electrodes 4 in the display area 1 are distributed in a matrix, and the display area 1 is provided with touch signal lines (only the multiplexed signal lines therein are shown in FIG. 8) respectively electrically connected to each of the touch electrodes 4. It should be understood that each of the touch electrodes 4 is connected to one or more touch signal lines 5, as long as each of the touch electrodes 4 is connected to a least one touch signal line 5 and any one of the touch signal lines 5 is connected to only one touch electrode 4. That is, the touch electrode 4 is a self-capacitive touch electrode, and can be multiplexed as a common electrode. In the display phase, the ninth switching transistor 69 is turned off, while the tenth switching transistor 610 is turned on; the multiplexed signal line 50 transmits a common voltage signal to each of the touch electrodes 4, so that the touch electrode 4 is multiplexed as a common electrode, and the liquid crystal deflects under an electric field formed between the pixel electrode and the common electrode, thereby achieving the display function. In the touch-sensing phase, the ninth switching transistor 69 is turned off, while the tenth switching transistor 610 is turned on; the multiplexed signal line 50 transmits a touch driving signal to each of the touch electrodes 4 and transmits a touch sensing signal on the touch electrode 4 to the driving circuit IC, thereby achieving the touch function. In the force-sensing phase, the ninth switching transistor 69 is turned on, while the tenth switching transistor 610 is turned off; the multiplexed signal line 50 transmits the input signal required by the first input terminal IN1 of the force-sensing sensor 3, so as to drive the force-sensing sensor 3 to work. By providing the ninth switch transistor 69, adverse effects of the force-sensing sensors 3 on the display function can be avoided in the display phase, and by providing the tenth switch transistor 610 in the meantime, adverse effects of the touch electrodes 4 on the force detection can be avoided in the force-sensing phase.

In an embodiment, as shown in FIG. 8 and FIG. 9, the ninth switch transistor 69 is an N-type transistor, and the tenth switch transistor 610 is a P-type transistor. Alternatively, the ninth switch transistor 69 is a P-type transistor, and the tenth switch transistor 610 is an N-type transistor.

Taking FIG. 9 as an example, when the ninth switch transistor 69 and the tenth switch transistor 610 are transistors that are the opposite of a control type, a gate of the ninth switch transistor 69 and a gate of the tenth switch transistor 610 can be simultaneously connected through a same control signal line, so that no separate control signal lines are required for these two switch transistors, thereby further saving the space of the display panel. FIG. 9 merely illustrates a. way in which the ninth switch transistor 69 and the tenth switch transistor 610 are connected through the same control signal line. However, the present disclosure covers other ways, for example using separate control signal lines. Any that can achieve the aspects of the present disclosure belongs to the protection scope of the present disclosure.

Figure 10:
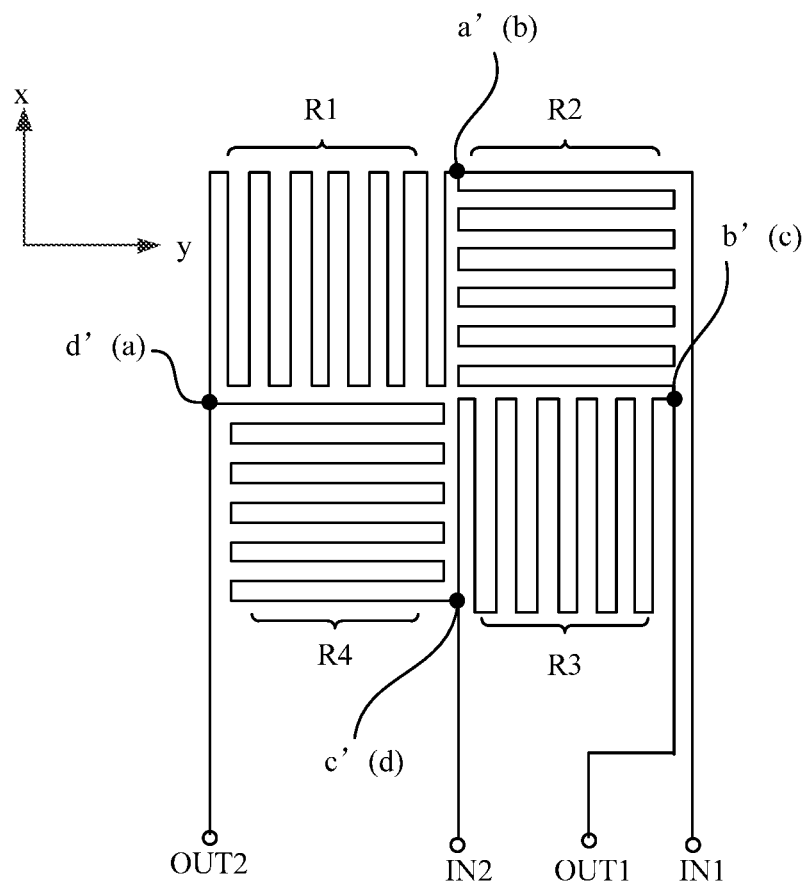
FIG. 10 is a structural schematic diagram of a force-sensing sensor according to an embodiment of the present disclosure.

FIG. 10 is a structural schematic diagram of a force-sensing sensor according to an embodiment of the present disclosure. In this embodiment, each force-sensing sensor is a Wheatstone bridge force-sensing sensor. The Wheatstone bridge force-sensing sensor includes a first input terminal IN1, a second input terminal IN2, a first output terminal OUT1, a second output terminal OUT2, a first force-sensitive resistor R1 connected in series between the first input terminal IN1 and the first output terminal OUT1, a second force-variable resistor R2 connected in series between the first output terminal OUT1 and the second input terminal IN2, a third force-variable resistor R3 connected in series between the second input terminal IN2 and the second output terminal OUT2, and a fourth force-variable resistor R4 connected in series between the second output terminal OUT2 and the first input terminal IN1.

The first force-variable resistor R1, the second force-variable resistor R2, the third force-variable resistor R3 and the fourth force-variable resistor R4 can be in various shapes. For example, as shown in FIG. 10, the force-sensing sensor extends in a first extension direction x and a second extension direction y. The first extension direction x and the second extension direction y are intersected. An extending length of the first force-variable resistor RI from a first end a to a second end a has a larger component in the first extension direction x than that in the second extension direction y. An extending length of the second force-variable resistor R2 from a first end b to a second end b' has a larger component in the second extension direction y than that in the first extension direction x, An extending length of the third force-variable resistor R3 from a first end c to a second end c' has a larger component in the first extension direction x than that in the second extension direction y. An extending length of the fourth force-variable resistor R4 from a first end d to a second end d' has a larger component in the second extension direction y than that in the first extension direction x. This arrangement can not only enable the first and third force-variable resistors R1 and R3 to sense strain in the first extension direction x as well as the second and fourth force-variable resistors R2 and R4 to sense strain in the second extension direction y, but also allow the whole force-sensing sensor to have a relatively small area and to be less affected by temperature. When the display panel is not subjected to strain perpendicular to the plane where the display panel is located, i.e., when a resistance values ratio of the first force-variable resistor RI to the second force-variable resistor R2 is equal to a resistance values ratio of the fourth force-variable resistor R4 to the third force-variable resistor R3, the bridge reaches an equilibrium state, and a voltage value at the first output terminal OUT1 is equal to a voltage value at the second output terminal OUT2. When the display panel is subjected to strain perpendicular to the plane where the display panel is located, the resistance values of the four force-variable resistors mentioned above are changed. That is, when a resistance values ratio of the first force-variable resistor R1 to the second force-variable resistor R2 is unequal to a resistance values ratio of the fourth force-variable resistor R4 to the third force-variable resistor R3, the equilibrium state of the bridge is broken, and the voltage value at the first output terminal OUT1 is unequal to the voltage value at the second output terminal OUT2. The voltage value difference between the first output terminal OUT1 and the second output terminal OUT2 is in dependence on the force value that the display panel is subjected to. In the process of force detection, a corresponding force value can be derived from the voltage values obtained at the first output terminal OUT1 and the second output terminal OUT2.

Figure 11:
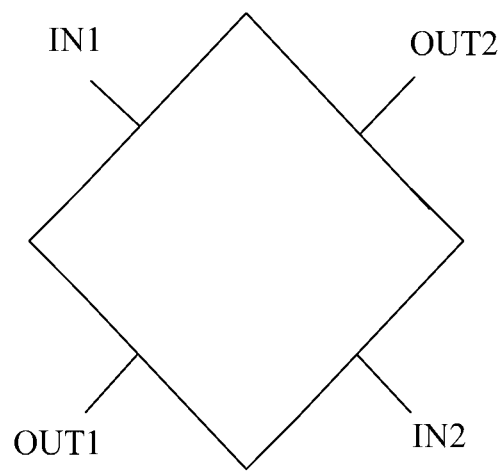
FIG. 11 is a structural schematic diagram of a force-sensing sensor according to another embodiment of the present disclosure.

FIG. 11 is a structural schematic diagram of a force-sensing sensor according to another embodiment of the present disclosure. In this embodiment, each of the force-sensing sensors is a silicon piezoresistive force-sensing sensor.

The silicon piezoresistive force-sensing sensor may be in a quadrangular structure. Four sides of the quadrangular structure are connected to the first input terminal IN1, the second input terminal IN2, the first output terminal OUT1 and the second output terminal OUT2, respectively, The first input terminal IN1 and the second input terminal IN2 are connected to two opposite sides, respectively. The first output terminal OUT1 and the second output terminal OUT2 are connected to two other opposite sides, respectively. The first input terminal IN1 and the second input terminal IN2 apply a bias voltage to the silicon piezoresistive force-sensing sensor. When the display panel is subjected to strain perpendicular to the plane where the display panel is located, the resistance value of the silicon piezoresistive force-sensing sensor changes, and the output signals of the first output terminal OUT1 and the second output terminal OUT2 change correspondingly. The force that the silicon piezoresistive force-sensing sensor is subjected to can be detected from the corresponding change of the voltages at the first output terminal OUT1 and the second output terminal OUT2.

Figure 12:
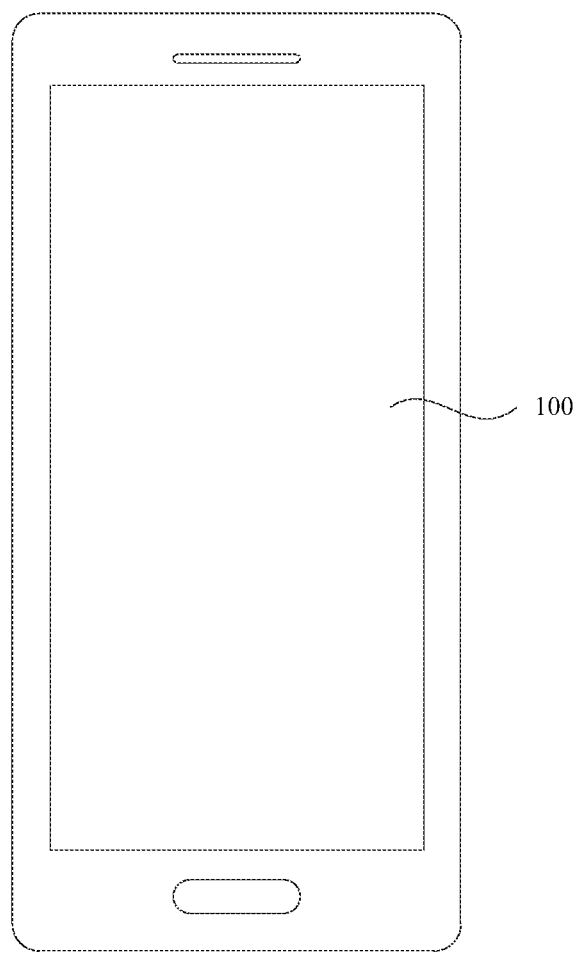
FIG. 12 is a structural schematic diagram of a display device according to an embodiment of the present disclosure.

FIG. 12 is a structural schematic diagram of a display device according to an embodiment of the present disclosure. The embodiment of the present disclosure provides a display device including the display panel 100 described above.

The specific structure and principle of the display panel 100 are same as those mentioned in any one of the above embodiments, and will not be described herein. The display device can be a touch panel, a mobile phone, a tablet computer, a portable computer, a television or any other electronic devices with the display function.

In the display device according to the embodiment of the present disclosure, the touch electrodes and the touch signal lines respectively electrically connected to each of the touch electrodes are disposed in the display area, the force-sensing sensors are disposed in the non-display area, the touch signal line includes multiplexed signal lines, and the multiplexed signal lines are coupled to the force-sensing sensor via the switch devices. Thus, the multiplexed signal lines are used to achieve signal transmission of the touch electrodes in the touch-sensing phase, and are also used to achieve signal transmission of the force-sensing sensor in the force-sensing phase. By multiplexing the signal lines, it is unnecessary to separately provide signal lines for the force-sensing sensors, so that the non-display area in the periphery of the display panel can occupy less space, thereby facilitating the design of a narrow frame.

An embodiment of the present disclosure further provides a display panel control method applicable to the display panel according to any one of the above embodiments. The method includes: a touch-sensing phase, in which the switch device 6 controls the disconnection between each of the force-sensing sensors 3 and a corresponding multiplexed signal line 50; and a force-sensing phase, in which the switch device 6 controls the connection between each of the force-sensing sensors 3 and a corresponding multiplexed signal line 50.

The specific structure and principle of the display panel and the specific process of the display panel control method are same as those mentioned in any one of the above embodiments, and will not be described herein.

In the display panel control method according to the embodiment of the present disclosure, the touch electrodes and the touch signal lines respectively electrically connected to each of the touch electrodes are disposed in the display area, the force-sensing sensors are disposed in the non-display area, the touch signal line includes multiplexed signal lines, and the multiplexed signal lines are coupled to the force-sensing sensor via the switch device and the transverse connecting line. Thus, the multiplexed signal lines are used to achieve signal transmission of the touch electrodes in the touch-sensing phase, and are also used to achieve signal transmission of the force-sensing sensor in the force-sensing phase. By multiplexing the signal lines, it is unnecessary to separately provide signal lines for the force-sensing sensors, so that the non-display area in the periphery of the display panel can occupy less space, thereby facilitating the design of a narrow frame.

What is claimed is:

1. A display panel, comprising:

a display area and a non-display area located in a periphery of the display area, wherein the display area comprises a plurality of data lines, wherein the plurality of data lines extends along a first direction and are arranged along a second direction, the non-display area comprises a first area and a second area, wherein the first area and the second area are located on two opposite sides of the display area in the second direction, respectively, and at least one first force-sensing sensor is provided in the first area and/or the second area;

a plurality of touch electrodes and a plurality of touch signal lines respectively electrically connected to each of the touch electrodes are provided in the display area, and the touch signal lines comprise at least one multiplexed signal line respectively corresponding to each of the at least one first force-sensing sensor;

the display area further comprises: at least one transverse connecting line respectively corresponding to each of the at least one first force-sensing sensor, the transverse connecting lines extending in the second direction; and the display panel further comprises at least one switch device respectively corresponding to each of the at least one first force-sensing sensor, wherein each of the at least one switch device and a corresponding transverse connecting line are connected in series between a corresponding first force-sensing sensor and a corresponding multiplexed signal line, so that each of the at least one first force-sensing sensor is electrically connected to a corresponding multiplexed signal line through a corresponding switch device, wherein each of the at least one switch device comprises a first switch transistor and a second switch transistor, the first switch transistor and the second switch transistor corresponding to a corresponding one of the at least one first force-sensing sensor;

each of the at least one multiplexed signal line comprises a first multiplexed signal line and a second multiplexed signal line;

each of the at least one transverse connecting line comprises a first transverse connecting line and a second transverse connecting line;

a first output terminal of each of the at least one first force-sensing sensor is electrically connected to a corresponding first multiplexed signal line through a corresponding first switch transistor and a corresponding first transverse connecting line, and a second output terminal of each of the at least one first force-sensing sensor is electrically connected to a corresponding second multiplexed signal line through a corresponding second switch transistor and a corresponding second transverse connecting line;

the touch signal lines further comprise a non-multiplexed signal line that is not electrically connected to any one of the at least one first force-sensing sensor;

the display panel further comprises a common electrode connecting line and at least one third switch transistor respectively corresponding to each of the at least one non-multiplexed signal line, wherein each non-multiplexed signal line is connected to the common electrode connecting line through a corresponding third switch transistor; and a first input terminal of each of the at least one first force-sensing sensor is electrically connected to the common electrode connecting line.

2. The display panel according to claim 1, further comprising a common electrode control signal line which is electrically connected to control terminals of each of the at least one first switch transistor, each of the at least one second switch transistor and each of the at least one third switch transistor, and wherein each of the at least one first switch transistor, each of the at least one second switch transistor and each of the at least one third switch transistor are N-type transistors or P-type transistors.

3. The display panel according to claim 2, further comprising at least one input signal line, wherein the at least one input signal line is electrically connected to a second input terminal of each of the at least one first force-sensing sensor.

4. The display panel according to claim 1, wherein each of the at least one multiplexed signal line further comprises a third multiplexed signal line and a fourth multiplexed signal line;

each of the at least one switch device further comprises a third switch transistor and a fourth switch transistor, the third switch transistor and the fourth switch transistor corresponding to a corresponding one of the at least one first force-sensing sensor;

each of the at least one transverse connecting line further comprises a third transverse connecting line and a fourth transverse connecting line; and a first input terminal of each of the at least one first force-sensing sensor is electrically connected to the third multiplexed signal line through a corresponding third switch transistor and a corresponding third transverse connecting line; and a second input terminal of each of the at least one first force-sensing sensor is electrically connected to the fourth multiplexed signal line through a corresponding fourth switch transistor and a corresponding fourth transverse connecting line.

5. The display panel according to claim 1, wherein the display area further comprises a plurality of scan lines, wherein the plurality of scan lines extends along the second direction and is arranged along the first direction;

each of the touch signal lines extends along the first direction in the display area; and the at least one transverse connecting line and the plurality of scan lines are arranged in a same layer.

6. The display panel according to claim 1, wherein the display area further comprises a plurality of scan lines, wherein the plurality of scan lines extends along the second direction and is arranged along the first direction;

each of the touch signal lines extends along the first direction in the display area;

the plurality of scan lines comprises the at least one transverse connecting line respectively corresponding to each of the at least one first force-sensing sensor; and each of the at least one switch device comprises a sixth switch transistor and a seventh switch transistor, the sixth switch transistor and the seventh switch transistor corresponding to a corresponding of the at least one first force-sensing sensor;

wherein each of the at least one first force-sensing sensor is connected a corresponding transverse connecting line through a corresponding sixth switch transistor, and each of the at least one transverse connecting line is connected to a corresponding multiplexed signal line through a corresponding seventh switch transistor.

7. The display panel according to claim 6, wherein
the non-display area further comprises a third area and a fourth area, wherein the third area and the fourth area are located on two opposite sides of the display area in the first direction, respectively, wherein at least one second force-sensing sensor is provided in the third area or the fourth area;
the plurality of data lines comprises at least one multiplexed data line respectively corresponding to each of the at least one second force-sensing sensor;
each of the at least one switch device further comprises an eighth switch transistor corresponding to each of the at least one second force-sensing sensor, and each of the at least one second force-sensing sensor is connected to a corresponding multiplexed data line through a corresponding eighth switch transistor.

8. The display panel according to claim 1, wherein
each of the at least one switch device further comprises a ninth switch transistor corresponding to a corresponding of the at least one first force-sensing sensor, and a first input terminal of each of the at least one first force-sensing sensor is connected to a corresponding multiplexed signal line through a corresponding ninth switch transistor; and
each of the at least one switch device further comprises a tenth switch corresponding to each of the at least one multiplexed signal line, and each of the at least one multiplexed signal line is connected to a corresponding touch electrode through a corresponding tenth switch.

9. The display panel according to claim 8, wherein the ninth switch transistor is an N-type transistor and the tenth switch transistor is a P-type transistor, or
the ninth switch transistor is a P-type transistor and the tenth switch transistor is an N-type transistor.

10. The display panel according to claim 1, wherein each of the at least one first force-sensing sensor is a Wheatstone bridge force-sensing sensor, wherein the Wheatstone bridge force-sensing sensor comprises a first input terminal, a second input terminal, a first output terminal, a second output terminal, a first force-variable resistor connected in series between the first input terminal and the first output terminal, a second force-variable resistor connected in series between the first output terminal and the second input terminal, a third force-variable resistor connected in series between the second input terminal and the second output terminal, and a fourth force-variable resistor connected in series between the second output terminal and the first input terminal.

11. The display panel according to claim 1, wherein each of the at least one force-sensing sensor is a silicon piezoresistive force-sensing sensor.

12. The display panel according to claim 1, wherein
the plurality of touch electrodes are multiplexed as a common electrode; and
the plurality of touch electrodes are arranged in a matrix.

13. A display device, comprising:
a display panel comprising a display area and a non-display area located in the periphery of the display area, wherein
the display area comprises a plurality of data lines, wherein the plurality of data lines extends along a first direction and are arranged along a second direction,
the non-display area comprises a first area and a second area, wherein the first area and the second area are located on two opposite sides of the display area in the second direction, respectively, and at least one first force-sensing sensor is provided in the first area and/or the second area;
a plurality of touch electrodes and a plurality of touch signal lines respectively electrically connected to each of the touch electrodes are provided in the display area, and the touch signal lines comprise at least one multiplexed signal line respectively corresponding to each of the at least one first force-sensing sensor;
the display area further comprises: at least one transverse connecting line respectively corresponding to each of the at least one first force-sensing sensor, the transverse connecting lines extending in the second direction; and
the display panel further comprises at least one switch device respectively corresponding to each of the at least one first force-sensing sensor, wherein each of the at least one switch device and a corresponding transverse connecting line are connected in series between a corresponding first force-sensing sensor and a corresponding multiplexed signal line, so that each of the at least one first force-sensing sensor is electrically connected to a corresponding multiplexed signal line through a corresponding switch device,
wherein each of the at least one switch device comprises a first switch transistor and a second switch transistor, the first switch transistor and the second switch transistor corresponding to a corresponding one of the at least one first force-sensing sensor;
each of the at least one multiplexed signal line comprises a first multiplexed signal line and a second multiplexed signal line;
each of the at least one transverse connecting line comprises a first transverse connecting line and a second transverse connecting line;
a first output terminal of each of the at least one first force-sensing sensor is electrically connected to a corresponding first multiplexed signal line through a corresponding first switch transistor and a corresponding first transverse connecting line, and a second output terminal of each of the at least one first force-sensing sensor is electrically connected to a corresponding second multiplexed signal line through a corresponding second switch transistor and a corresponding second transverse connecting line;
the touch signal lines further comprise a non-multiplexed signal line that is not electrically connected to any one of the at least one first force-sensing sensor;
the display panel further comprises a common electrode connecting line and at least one third switch transistor respectively corresponding to each of the at least one non-multiplexed signal line, wherein each non-multiplexed signal line is connected to the common electrode connecting line through a corresponding third switch transistor; and
a first input terminal of each of the at least one first force-sensing sensor is electrically connected to the common electrode connecting line.

14. A display panel control method applied to the display panel comprising a display area and a non-display area located in the periphery of the display area, wherein
the display area comprises a plurality of data lines, wherein the plurality of data lines extends along a first direction and is arranged along a second direction,
the non-display area comprises a first area and a second area, wherein the first area and the second area are located on two opposite sides of the display area in the second direction, respectively, and at least one first force-sensing sensor is provided in the first area and/or the second area;

a plurality of touch electrodes and a plurality of touch signal lines respectively electrically connected to each of the touch electrodes are provided in the display area, and the touch signal lines comprise at least one multiplexed signal line respectively corresponding to each of the at least one first force-sensing sensor;

the display area further comprises: at least one transverse connecting line respectively corresponding to each of the at least one first force-sensing sensor, the transverse connecting lines extending in the second direction; and the display panel further comprises at least one switch device respectively corresponding to each of the at least one first force-sensing sensor, wherein each of the at least one switch device and a corresponding transverse connecting line are connected in series between a corresponding first force-sensing sensor and a corresponding multiplexed signal line, so that each of the at least one first force-sensing sensor is electrically connected to a corresponding multiplexed signal line through a corresponding switch device, wherein each of the at least one switch device comprises a first switch transistor and a second switch transistor, the first switch transistor and the second switch transistor corresponding to a corresponding one of the at least one first force-sensing sensor;

each of the at least one multiplexed signal line comprises a first multiplexed signal line and a second multiplexed signal line;

each of the at least one transverse connecting line comprises a first transverse connecting line and a second transverse connecting line;

a first output terminal of each of the at least one first force-sensing sensor is electrically connected to a corresponding first multiplexed signal line through a corresponding first switch transistor and a corresponding first transverse connecting line, and a second output terminal of each of the at least one first force-sensing sensor is electrically connected to a corresponding second multiplexed signal line through a corresponding second switch transistor and a corresponding second transverse connecting line;

the touch signal lines further comprise a non-multiplexed signal line that is not electrically connected to any one of the at least one first force-sensing sensor;

the display panel further comprises a common electrode connecting line and at least one third switch transistor respectively corresponding to each of the at least one non-multiplexed signal line, wherein each non-multiplexed signal line is connected to the common electrode connecting line through a corresponding third switch transistor; and a first input terminal of each of the at least one first force-sensing sensor is electrically connected to the common electrode connecting line, wherein the display panel control method comprises:

a touch-sensing phase, in which the at least one switch device controls a disconnection between each of the at least one first force-sensing sensor and a corresponding multiplexed signal line; and a force-sensing phase, in which the at least one switch device controls a connection between each of the force-sensing sensors and a corresponding signal line.

* * * * *